(12) United States Patent
Schott

(10) Patent No.: US 8,171,196 B2
(45) Date of Patent: May 1, 2012

(54) SERIAL BUS SYSTEM, NODE DEVICE AND INPUT/OUTPUT CARD THAT CAN BE CONNECTED TO THE NODE DEVICE

(75) Inventor: Gerhard Schott, Hemhofen (DE)

(73) Assignee: Siemens Aktiengesellschaft, Munich (DE)

( * ) Notice: Subject to any disclaimer, the term of this patent is extended or adjusted under 35 U.S.C. 154(b) by 169 days.

(21) Appl. No.: 12/084,921

(22) PCT Filed: Nov. 10, 2006

(86) PCT No.: PCT/EP2006/068355
§ 371 (c)(1),
(2), (4) Date: May 11, 2009

(87) PCT Pub. No.: WO2007/054567
PCT Pub. Date: May 18, 2007

(65) Prior Publication Data
US 2009/0222608 A1    Sep. 3, 2009

(30) Foreign Application Priority Data

Nov. 14, 2005    (DE) .................. 10 2005 054 202

(51) Int. Cl.
*G06F 13/00*    (2006.01)
(52) U.S. Cl. .................. 710/107; 710/305; 370/438
(58) Field of Classification Search .................. 710/107, 710/305–306, 300, 315, 301–304; 370/438
See application file for complete search history.

(56) References Cited

U.S. PATENT DOCUMENTS

| | | | |
|---|---|---|---|
| 5,479,395 A * | 12/1995 | Goodman et al. | 370/438 |
| 5,978,578 A | 11/1999 | Azarya et al. | |
| 6,526,464 B1 | 2/2003 | Jobs et al. | |
| 6,891,849 B1 | 5/2005 | Jasperneite et al. | |
| 7,035,714 B2 * | 4/2006 | Anderson et al. | 700/228 |
| 7,668,276 B2 * | 2/2010 | Hampel et al. | 375/371 |
| 2003/0014535 A1 | 1/2003 | Mora | |

FOREIGN PATENT DOCUMENTS

| | | |
|---|---|---|
| CN | 2475234 Y | 1/2002 |
| DE | 200 22 210 U1 | 5/2002 |
| DE | 69730593 T2 | 10/2005 |
| EP | 1 400 882 A2 | 3/2004 |
| WO | WO 2005/050894 A2 | 6/2005 |

OTHER PUBLICATIONS

Wang Hai Qun et al., "S7-400 Profibus-DP, The application of S7-400 and Profibus-DP net in electric control", 2004, vol. 20, No. 4, Magazine.

* cited by examiner

*Primary Examiner* — Brian Misiura
*Assistant Examiner* — Kim Huynh

(57) ABSTRACT

There is described a node device of a serial bus system, a bus system with a node device of this type, and an input/output card. In serial bus system, in which individual node devices can have only a limited address space, and in which a number of input/output cards can be connected in order to control and/or regulate an item of external peripheral equipment, limitations arise for the individual input/output cards with regard to the available address space. Normally, the input/output cards, which are connected to the node device, are required to divide the address space of the node device among each other. In order to rectify this problem, the invention provides that a node device of a serial bus system, which has slots for input/output cards, is additionally equipped with a splitter for duplicating a received bus signal and for injecting the duplicated bus signal into another data line, the additional data line serially connecting the node device to input/output cards connected via the slots.

10 Claims, 2 Drawing Sheets

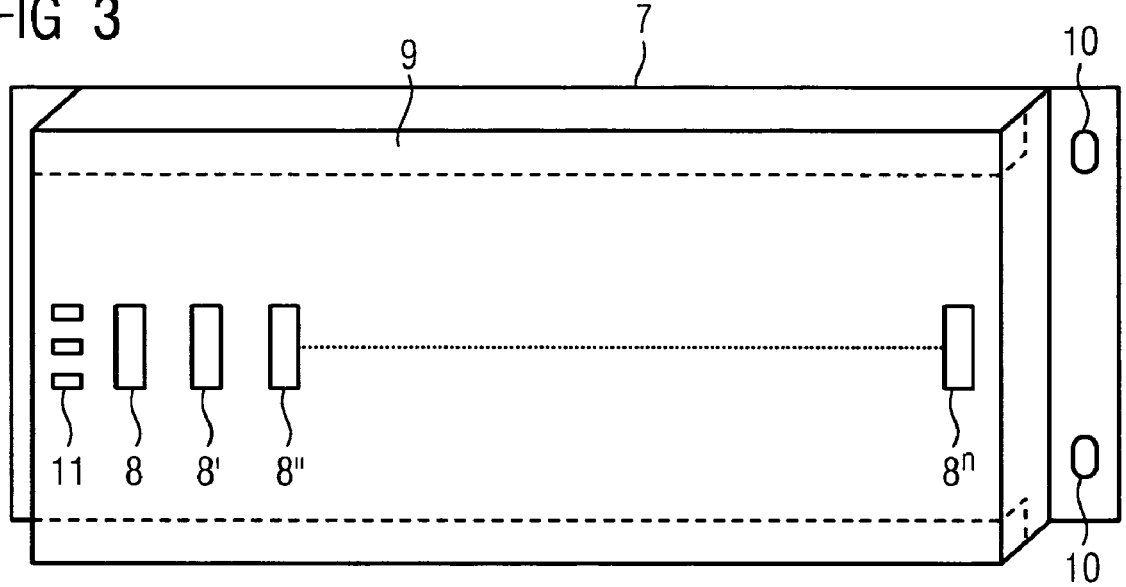
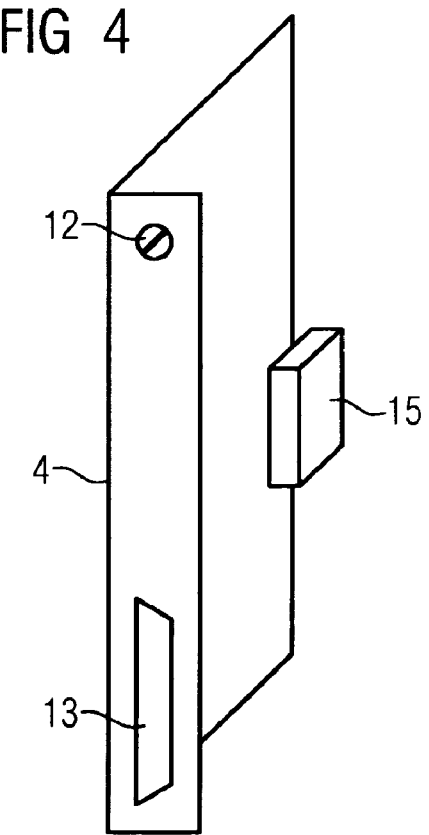

US 8,171,196 B2

SERIAL BUS SYSTEM, NODE DEVICE AND INPUT/OUTPUT CARD THAT CAN BE CONNECTED TO THE NODE DEVICE

CROSS REFERENCE TO RELATED APPLICATIONS

This application is the US National Stage of International Application No. PCT/EP2006/068355, filed Nov. 10, 2006 and claims the benefit thereof. The International Application claims the benefits of German application No. 10 2005 054 202.6 DE filed Nov. 14, 2005, both of the applications are incorporated by reference herein in their entirety.

FIELD OF INVENTION

The invention relates to serial bus systems, in particular to Profibus or Profinet systems. The invention further relates to node devices of such bus systems and likewise input/output cards that can be connected to such node devices.

BACKGROUND OF INVENTION

Serial bus systems sometimes have a limited address space so that the number of addresses available has to be carefully managed. An example of this is Profibus according to the standards IEC 61158 and IEC 61784. Profibus has a maximum of 253 addresses available, some of which are reserved, and node devices can be operated using the remaining addresses. Profibus is widely used in industry for automation systems with decentralized peripherals.

Node devices for a Profibus system have a Profibus node, a PCB, also known as a Backplane, and sometimes also connections for input/output cards. The node device may take up a maximum of 16 addresses, due to a standardization or restriction resulting from the Profibus standard.

The address space of 16 addresses that is available for each node device is generally adequate if conventional modules are connected via the input-output modules, since in this case the address space required for the individual input/output card is limited. For this reason, a plurality of input/output cards can generally be connected to a node device, said cards dividing the available address space between them.

If a complex functional module is to be controlled within an automation system, then this module is connected to the node device via an input/output card and requires for this purpose an address space which is sometimes equivalent in size to the address space for the node device as a whole. Depending on the complexity of the functional module, there is therefore possibly no longer the option of connection to the node device, in particular if the input/output card on which the complex functional module is connected has to share addresses with other input/output cards.

It clearly emerges from the foregoing that connection problems arise if only a limited address space is available to a node device. This limitation of the address space can arise here because of a standard, as in the case of Profibus.

To solve this problem, it has been suggested that each node device could be provided with an address and the input/output values of the input/output modules could be shown on the register of the node device. This requires complex software in order to produce a registering map. If, for example, a target speed for an electric motor connected to an input/output card is to be determined, this speed is then recorded in the register for the node device and is then transmitted from the register to a dual-port RAM of the input-output module. From there the target value is transmitted to the electric motor. The reverse applies accordingly to reading off the target values for the speed of said electric motor. This architecture is found, for example, in multi-motor drives, in which the individual drive devices are connected in a string or in several strands via Profibus.

A further known approach to solving the aforementioned problem consists in equipping each node device with a separate address- and data bus that is different from the Profibus. The input/output cards thereof are then connected to said address- and data bus of the node device. As a result, the address space in the individual node devices is vastly increased, the address space being quickly assigned to the slots. This means that one or a plurality of addresses is/are always reserved for a slot to which an input/output card is connected, even if no input/output card is actually connected.

U.S. Pat. No. 5,978,578 describes a field bus system to which input/output cards are connected. Input-output devices such as sensors, motors, monitors, machines and so on are connected to an input/output card that has a control bus available. The control bus is designed such that devices with an ISA, PCI, or Compact PCI bus or other bus can be connected thereto.

SUMMARY OF INVENTION

Based on the aforementioned prior art, the invention addresses a problem of providing a simple solution to the address space limitations for an input/output card in a serial bus system in which the node devices can have only a limited address space available and in which a plurality of input/output cards, which have to divide between them the address space in the node device, can be connected to the respective node device.

This problem is solved by the features of the independent claims. Advantageous further developments are set out in the features of the sub-claims.

A first aspect of the invention suggests equipping a node device for a serial bus system with a PCB, also known as a backplane PCB. The backplane PCB has data lines for connection to a front and a rear node device in the serial bus system and slots for input/output boards. The backplane additionally has a splitter to duplicate a received bus signal and for injecting the duplicated bus signal into a further data line. The further data line serially connects the node device to the input/output cards connected via the slots.

The inventive concept resides in the fact that the node device continues to remain in the original serial bus system and the bus system is provided with a linear additional string, to which the input/output cards are serially connected. The node device is serially connected to the input/output cards connected to it, so that the node device may be seen to this extent as a hub for the input/output cards.

The advantage of this suggestion is that the input/output cards are themselves full-status nodes of the serial bus system, each with its own bus address. Thus the input/output cards that are connected to a node device no longer have to divide between them the address space for said node device. This also has the advantage that the address space for all the input/output cards connected to the node device can be greater than the address space for an individual node device per se.

A further advantage is that the solution allows the creation of a node device which is particularly simple in design. The node devices can thus be made simpler than existing node devices, such that they require fewer components and a less complex firmware. The node device requires neither a separate address- and data bus nor a register-mapping functionality in which the input-output values of devices that are intended to be connected or disconnected to or from the bus system via an input/output card have to be stored in the interim in a register. The logic for the PCB is thus simplified considerably, which means that the PCB can be more economically priced and also less liable to faults.

In a preferred embodiment of the invention, the serial bus system is a Profibus system or a Profinet system. The Profibus system in accordance with the standards IEC 61158 and IEC 61784 is an example with limited address space: there are Profibus addresses 0 to 253, addresses 0, 1 and 2 being reserved, so that the address space as a whole is limited. A maximum of 16 Profibus addresses are allowed per node device.

The backplane extracts data telegrams issued from the serial bus system and channels them into a further data line. The extraction process should not alter the signal level and should not lead to signal delays in the serial bus system. Preferably, at least one signal amplifier (extraction amplifier) is assigned to the splitter. Additionally, a signal shaper, in the form of a chip, for example, can be provided for the extraction in order to ensure the correct signal profile with an optionally adapted timing in the further data line and in order to suppress interference.

Conversely, the backplane injects data telegrams emanating from the further data line into the serial bus system. As in the corresponding case of extraction, a signal amplifier (injection amplifier) and a signal shaper, said shaper being in the form of a chip, for example, can be assigned to the splitter.

The node devices are preferably system components of an automation system and in particular of a process control system or of a power station control system. It is possible to connect drive devices, low voltage inverters for example, such as the MicroMaster marketed by the applicant or even the MasterDrive, likewise marketed by the applicant, to the node devices via input/output cards, in order to control variable-speed drives. Furthermore, regulator modules or generally multi-functional modules such as high-speed digital input modules with a time stamp, modules with binary inputs and outputs for switching motors on or off or modules with binary and analog inputs and outputs, the last-mentioned modules being for regulating circuits, for example, can be connected to the node devices via input/output cards.

In a serial bus system that has at least one of the aforementioned node devices, it is preferable for a bus address to be assigned to each input/output card that is connected. However, no bus address is reserved for input/output cards that are not connected. This means that only the input/output cards that are actually connected get a bus address assigned to them in the bus system, for example, in the Profibus system.

The input/output cards that are intended to work in the bus system in conjunction with the node devices according to the invention have been modified compared to those that exist in the prior art and have a bus node available so that they can be incorporated into a serial bus system as an independent node device. Said bus node may be a Profibus or Profinet bus node, for example. Even if the existing digital input/output cards become more complex as a result of the requirement for a bus node, such cards are simplified elsewhere, since they now no longer require a dual-port RAM. The input/output card further has a plug-in connector and input means for connection to the bus system. A processor for the data processing now no longer deposits in the RAM data such as the target value for an actuating variable, but supplies the data directly to the appointed node and thus makes it available to the node devices of the serial bus system in general.

The backplane can further be designed to provide the power supply for the slots. In this way a separate support for the slots becomes superfluous.

BRIEF DESCRIPTION OF THE DRAWINGS

Further details and advantages of the invention will emerge from the detailed description that follows with reference to the attached drawings, these being set out hereafter as non-restrictive examples. The drawings show:
FIG. 3: a PCB of the node device,
FIG. 4: an input/output board.

DETAILED DESCRIPTION OF INVENTION

Figure 1:
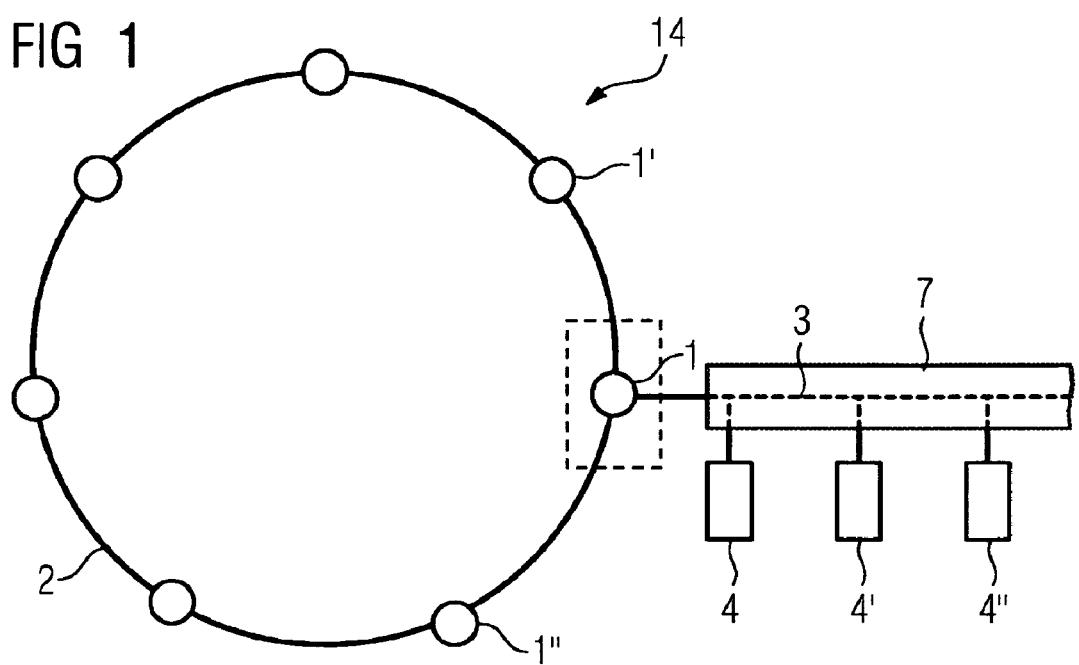
FIG. 1: a schematic view of a serial bus system.

FIG. 1 shows components 1, 1', 1" of an automation system, which are interconnected via data lines 2 of a Profibus. The bus nodes are arranged in a ring topology, in which the node device 1 for a data telegram running in a clockwise direction has a front node device 1' and a rear node device 1". Instead of the ring topology it is also possible to select a serial arrangement or a string topology with a suitable terminal resistance.

Further emanating from the node device 1 there is a linear additional string in the form of a further data line 3. Input/output cards 4, 4', 4" are serially connected to said further data line 3.

Figure 2:
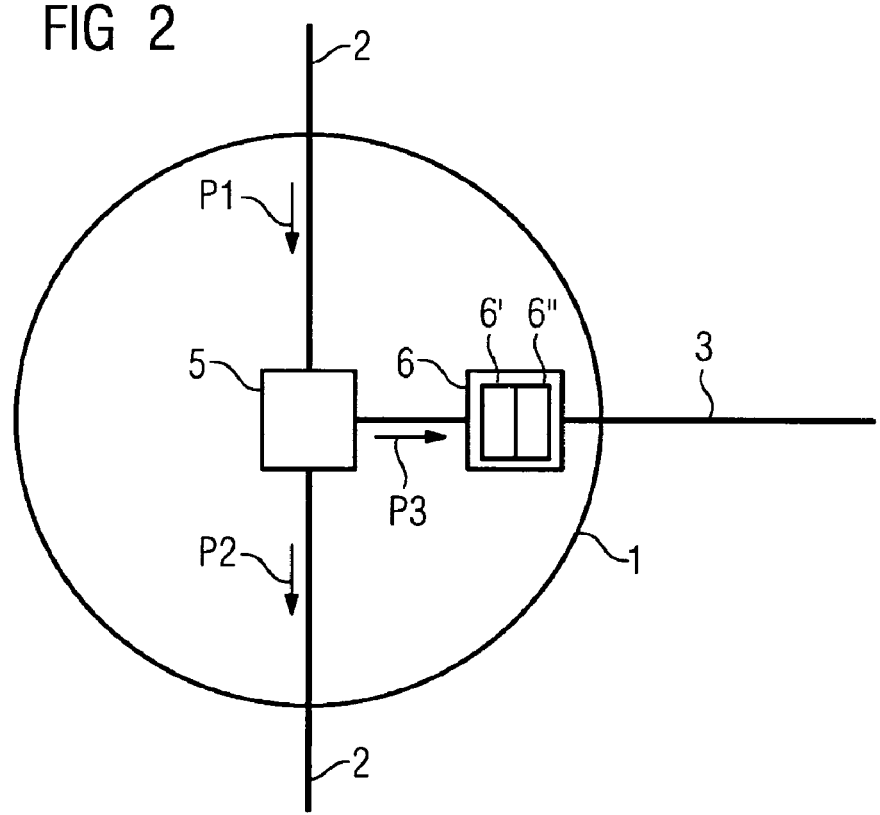
FIG. 2: a schematic view of a node device of the bus system.

FIG. 2 shows a schematic diagram of a node device. The node device 1 has a splitter or hub 5 to duplicate bus signals. If a data telegram from the node device 1' arrives at the node device 1 via the data line 2 according to the arrow P1, said telegram is not only redirected according to arrow P2 in the direction of the node device 1", but is duplicated in the splitter 5 and injected into the further data line 3 according to the arrow P3 in the direction of the module 6. The module 6 has the functionality of a repeater, that is, it not only amplifies the incoming signal, but also regenerates it. Regeneration includes signal conversion and signal retiming. The module 6 thus includes both an amplifier 6' and a signal shaper 6".

FIG. 3 shows a PCB of the node device, sometimes also referred to in the prior art as a backplane. Each node device 1, 1', 1" of the bus system 1 in FIG. 1 has such a PCB 7, as shown in FIG. 3. Said PCB 7, which is shown schematically, has slots 8, 8', 8" to 8"' for connection in each case to a plug-in card (not shown); n is a natural number and can be 15 or 16, for example. The plug-in cards are, as explained below in further detail, input/output cards to control and/or regulate electrical components. During operation, the PCB 7 and the input/output cards 4, 4', 4" form a compact unit. The PCB 7 is attached via at least one locking arrangement 9 to a retaining element, which is not shown. Screw connection is also possible via the screw apertures 10. An electrical connection 11 for power supply completes the PCB 7.

Each input/output card 4, 4', 4" is directly connected to the data line 3, see FIG. 1. By simply plugging the input/output card into the PCB, said card becomes integrated with the bus system. Correspondingly, simply pulling out the input/output card means that said card has been removed from the bus system. Connection of the input/output cards 4, 4', 4", as shown in FIG. 1, to the respective further data line 3 ensures that only input/output cards that are actually connected form node devices of the bus system 1 with their own bus addresses. Slots that are not occupied do not therefore require an address in the bus system. All the input/output cards are equal-status nodes of the bus system so that the input/output cards connected via slots 8, 8', 8" to 8''' do not have to share the address space in a node device with the PCB 7.

FIG. 4 shows an input/output card 4, which is connected via a plug 15 to a slot 8 of the PCB 7. Furthermore, the input/output card 4 can be secured to the PCB by a screw connection 12. In this case, the plug 15 provides both the power supply for the input/output card, and also, however, for the bus signals from the input/output card to the node device. The input/output card 4 additionally has a module 13 with a bus connection, process signal connection and a processing unit with which external devices can be controlled and/or regulated.

The invention claimed is:

1. A node device of a serial bus system, comprising:
   a backplane, wherein the backplane has
      data lines to connect the node device to a front node device and to a rear node device in the serial bus system,
      slots for input/output cards, and
      a splitter to duplicate a received bus signal, and to inject the duplicated bus signal into a further data line, wherein the further data line serially connects the node device to input/output cards which are connected via the slots,
   wherein a bus address is assigned to each input/output card that is connected via the slots so that all connected input/output cards are equal-status nodes of the serial bus system, and
   wherein each input/output card comprises a bus connection, a process signal connection and a processing unit for controlling external devices.

2. A node device as claimed in claim 1, wherein the serial bus system is a Profibus system.

3. A node device as claimed in claim 1, wherein the serial bus system is a Profinet system.

4. A node device as claimed in claim 1, wherein the splitter has at least one signal amplifier and at least one signal shaper for data telegrams that are to be injected into the further data line.

5. A node device as claimed in claim 1, wherein the splitter has at least one signal amplifier and at least one signal shaper for data telegrams that are to be injected from the further data line into the serial bus system.

6. A node device as claimed in claim 4, wherein the splitter has at least one signal amplifier and at least one signal shaper for data telegrams that are to be injected from the further data line into the serial bus system.

7. A node device as claimed in claim 1, wherein the node devices are system components of an automation system.

8. A node device as claimed in claim 1, wherein the node devices are system components of a process control system.

9. A node device as claimed in claim 1, wherein the node devices are system components of a power station control system.

10. A Profibus system, comprising:
    a node device with a backplane, wherein the backplane has:
       data lines to connect the node device to a front node device and to a rear node device in the serial bus system;
       slots for input/output cards; and
       a splitter to duplicate a received bus signal and to inject the duplicated bus signal into a further data line, wherein the further data line serially connects the node device to input/output cards which are connected via the slots,
    wherein a bus address is assigned to each input/output card that is connected via the slots so that all connected input/output cards are equal-status nodes of the serial bus system, and
    wherein each input/output card comprises a bus connection, a process signal connection and a processing unit for controlling external devices.

* * * * *